No. 702,271. Patented June 10, 1902.
W. F. WILLIAMS.
ELASTIC TIRE.
(Application filed Apr. 19, 1902.)

(No Model.)

WITNESSES:
W. M. Avery
H. J. Bernhard

INVENTOR
William Frederick Williams
BY
Munn
ATTORNEYS

UNITED STATES PATENT OFFICE.

WILLIAM FREDERICK WILLIAMS, OF LONDON, ENGLAND.

ELASTIC TIRE.

SPECIFICATION forming part of Letters Patent No. 702,271, dated June 10, 1902.

Application filed April 19, 1902. Serial No. 103,701. (No model.)

*To all whom it may concern:*

Be it known that I, WILLIAM FREDERICK WILLIAMS, gentleman, a subject of the King of Great Britain, residing at 4 Denman street, Piccadilly Circus, London, England, have invented new and useful Improvements in Elastic Tires, of which the following is a specification.

My invention relates to the construction of elastic tires, and has for object to facilitate the manufacture of a tire combining the resiliency of a hollow rubber tire with the resistance of a solid tire to crushing, and particularly the resistance to lateral deformation under the sideway pressure to which the tire is liable to be exposed in ordinary use, a further object being to enable the necessary degree of resiliency to be obtained without the necessity of employing rubber of a highly elastic and expensive quality.

Reference is to be had to the accompanying drawings, in which—

Figure 1:
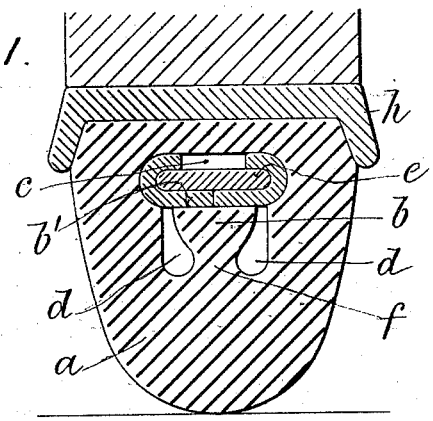
Figure 2:
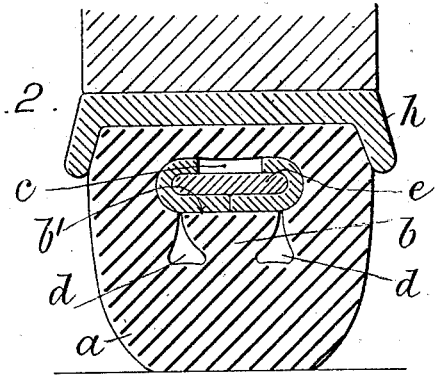
Figure 3:
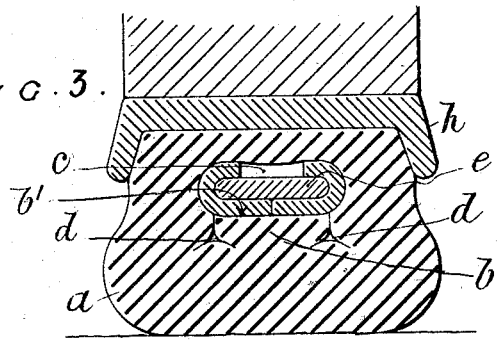
Figure 4:
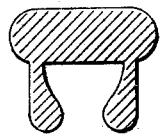
Figure 5:
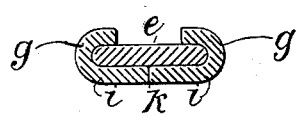

Figure 1 is a cross-section of the tire embodying my improvement, the tire being shown in its normal condition. Figs. 2 and 3 are cross-sections, respectively, showing the tire as partially and as fully compressed under the load. Fig. 4 is a cross-section of the mandrel upon which the tire is molded. Fig. 5 is a cross-section of a holding-on band having its edges sheathed in protective beadings.

In the manufacture of elastic tires the primary object is to obtain a proper degree of elasticity proportionate to the load to be put upon the wheel; but if the tire be solid this high degree of elasticity can only be obtained at very great expense by the employment of india-rubber of very high quality. It has been sought to combine the two antagonistic conditions of elasticity and cheapness by the use of rubber of much lower grade and of proportionately lesser elasticity, the tire being made hollow, so as by this means to impart to the tire a degree of elasticity which the rubber does not inherently possess, and at same time to economize in the quantity of rubber used; but a hollow tire made of rubber of a moderately elastic quality, even if able to resist crushing under the ordinary load which comes upon it on a smooth road, is necessarily either deficient in elasticity on ordinarily smooth roads, or if sufficiently elastic under those circumstances is (by the mere fact of its being hollow and devoid of internal support) so near its limit of resistance to crushing that even when new it is unable to withstand the effect of sudden extra pressure of the load due to bumping of the wheel over uneven ground, while after the tread portion has been worn away to only a moderate extent, the ability to resist crushing under an ordinary load and on a smooth road is wholly lost and the tire becomes useless. As one means for remedying this objection it has been proposed to insert within the bore of the tire a core of more elastic rubber than the tire and of different cross-sectional form to the bore of the tire; but this core, besides being difficult to introduce, is liable to creep within the tire under the rolling pressure to which it is subjected, and also to chafe by the friction between the core and the wall of the bore with which it is in contact.

The present invention consists in providing a hollow tire with an internal elastic core integral with the tread portion of the tire and projecting therefrom toward the base of the tire, the said core being adapted by its cross-sectional form to take a broad bearing against the band by which the tire is clasped to its seat in the wheel-rim, and to thereby assist in preventing excessive lateral deformation under side stress to which the tire may be subjected, there being normally vacant spaces between the sides of the core and the side walls of the tire. These spaces are open throughout their length to the bore of the tire and are adapted to permit free lateral expansion of the core and inwardly-directed expansion of the walls and tread portion of the tire, such that under the compression due to the direct incidence of the load the surfaces bounding the vacant spaces mutually approach each other to an approximately equal extent, so that the resistance to crushing gradually increases with the increase of the load.

*a* is the tire, made of any suitable external cross-sectional form, and *b* is the internal supporting-core, made integrally with the inner wall of the tread portion of the tire, the tire and core being made either in a mold or by extrusion through a die corresponding in form to the external form of the tire and upon a mandrel, Fig. 4, of a cross-sectional form adapted to produce a bore $c$ of transversely-oblong cross-sectional form for the reception of the holding-on band $e$ and spaces $d\ d$ intervening between the sides of the core $b$ and the side portions of the tire, the said spaces $d$ opening as narrow slits to the bore $c$ at the extreme sides of the latter and being of substantially pear shape in cross-section, their inner portions of bulbous section being arched toward the central plane of the tire.

The tire $a$ is of D or approximately D section, and the core $b$ is of approximately triangular or semicircular form in cross-section, so as to present a broad base $b'$ to contact with the holding-on band $e$, the core $b$ being united to the tread portion of the tire by a relatively narrow neck portion $f$ of rubber intervening between the inwardly-arched bulbous-shaped portions of the spaces $d$. The core $b$ being integral at $f$ with the tread of the tire, it follows that when the tire is subjected to compression under the weight of the load the connection of the core with the tread of the tire at $f$ will prevent any lateral motion of the tread relatively to the core, which would be liable to occur in consequence of any side stress coming on the tire, while the broad base $b'$ of the core, which bears upon the holding-on band $e$, will prevent rocking or rolling movement of the core upon its abutment formed by the holding-on band $e$. The core will thus give the tire such lateral stability as to prevent the tendency to lateral unsymmetrical deformation under pressure coming on the tire in a more or less lateral direction. The tire being clasped by the holding-on band passing through it tightly into its seat in the channeled metal tire $h$, (the side flanges of which metal tire serve to laterally confine the elastic tire within itself,) the direct pressure due to the effect of the load is to cause the sides of the spaces $d$ to be gradually bulged inward toward one another in the form of three convexly-curved surfaces, as shown in successive stages in Figs. 2 and 3, until those surfaces finally meet toward a common center, and the spaces $d$ are almost entirely occupied by the expansion therein of the rubber forming the tread, the sides, and the core of the tire.

In order to prevent the narrow edges of the holding-on band $e$ from cutting or chafing the walls of the bore $c$ of the tire, those edges may be protected by sheaths or beadings, such as $g$, Fig. 5, of U or J form in cross-section, presenting rounded surfaces of relatively large radius to the walls of the bore. The outer (in the case of a sheath of J form the longer) limb $i$ of each sheath overlies the outer or tread face of the band $e$ and is of such length that the opposed limbs $i$ of the two sheaths meet edge to edge, as at $k$, to form a flat or continuous bearing-surface for the base $b'$ of the core $b$.

I claim—

1. An elastic tire provided near its base with a longitudinal bore of transversely-oblong cross-sectional form, a holding-band fitted in said bore, and a core integral with the tread portion of the tire and having a bearing-face at the base engaging the holding-band, the said core being separated from the lateral walls of the tire by intervening spaces opening by narrow slits into the bore at or near the sides thereof, the said spaces having enlarged portions extending inwardly toward the core and reducing the cross-sectional area thereof so as to form a neck portion united with the tread portion of the tire, the sides of the core being convexly curved from the neck to the base.

2. An elastic tire of approximately D-section, provided near its base with a transversely-elongated bore, a band arranged in said bore and provided with sheaths fitted to the edge portions thereof and corresponding to the shape of the bore, the limbs of the sheaths on the outer or tread face of the band meeting edge to edge to form a continuous bearing-surface, and an internal core integral with the tread portion and having a bearing-face at its base for engaging the said bearing-surface, the core being separated from the lateral walls of the tire by intervening spaces opening as narrow slits to the bore at or near the sides thereof, the said spaces having enlarged portions extending inwardly toward the cone and reducing the cross-sectional area thereof so as to form a neck portion united with the tread portion of the tire.

WILLIAM FREDERICK WILLIAMS.

Witnesses:
T. W. KENNARD,
C. G. CLARK.